United States Patent [19]

Skaggs et al.

[11] Patent Number: 4,913,958

[45] Date of Patent: Apr. 3, 1990

[54] PROCESS FOR PREPARING POLYURETHANE-BACKED SUBSTRATE

[75] Inventors: Kenneth W. Skaggs; Robert B. Turner, both of Lake Jackson, Tex.; Terry L. Lamb, Ringgold, Ga.

[73] Assignee: The Dow Chemical Company, Midland, Mich.

[21] Appl. No.: 373,856

[22] Filed: Jun. 29, 1989

[51] Int. Cl.$^4$ .......................... B32B 3/26; B05D 5/00
[52] U.S. Cl. ................................ 428/318.6; 427/244; 427/373; 428/95; 428/246; 428/284; 428/319.1; 428/319.3; 428/423.3
[58] Field of Search .............. 428/95, 246, 284, 318.6, 428/319.1, 319.3, 423.3; 427/244, 373

[56] References Cited

U.S. PATENT DOCUMENTS 4,483,894  11/1984  Porter et al. ...................... 428/319.3

Primary Examiner—William J. Van Balen

[57] ABSTRACT

Substrates having successive layers of a cellular polyurethane and a noncellular polyurethane are prepared using certain siloxane-polyether block copolymers in the noncellular polyurethane formulation. The use of the block copolymer reduces or eliminates the formation of a bubble line at the interface of the polyurethane layers, thereby improving physical and cosmetic properties of the carpet.

12 Claims, No Drawings

PROCESS FOR PREPARING POLYURETHANE-BACKED SUBSTRATE

BACKGROUND OF THE INVENTION

This invention relates to the preparation of polyurethane-backed substrates, particularly textiles backed with a cellular polyurethane backing.

Polyurethane-backed textiles are well known and described, for example, in U.S. Pat. Nos. 3,821,130, 3,862,879, 3296,159, 4,657,790, and 4,696,849. There are two general types of polyurethane backings commonly used. One type is a substantially non-cellular backing which is normally coated onto the back of tufted textiles to bind the individual tufts of facing yarn to a primary scrim or grid. Such backings are often referred to as "unitary" backings. The other important type is a cellular backing which is attached to a textile to provide an attached cushion. In the carpet area, this type of backing often eliminates the need to install a separate padding material.

It is often desirable to apply multiple layers of the polyurethane. This is particularly true in preparing textiles with a cellular polyurethane backing. In preparing these textiles, it is preferred to apply a substantially non-cellular polyurethane directly to the back of the textile, and then overcoat this "precoat" with a cellular polyurethane layer. The precoat layer helps bind the facing material to the textile and provides a smoother surface on which to apply the cellular layer. This in turn helps to prepare a cellular layer of uniform gauge, which is of particular importance.

In order for the textile to have optimal properties, it is necessary that the bonding between the textile and the various layers be as strong as possible. Unfortunately, quite often a line of bubbles develops at the interface between successive polyurethane layers, especially between the layers of non-cellular polyurethane and cellular polyurethane. The bubble line weakens the bond between the layers to the point that they can often be easily peeled apart. When installed, forces applied to the exposed surface of the textile can cause a separation of the layers when such a bubble line is present. In addition, the presence of the bubble line is cosmetically unacceptable.

Accordingly, it is desirable to prepare a polyurethane-backed textile wherein the bubble line between successive polyurethane layers is minimized or eliminated.

SUMMARY OF THE INVENTION

This invention is in one aspect a process for preparing a polyurethane backed substrate, comprising applying to a substrate a first layer of a polyurethane-forming composition and applying to said first layer a second layer of a polyurethane forming composition and curing said layers.

wherein one of said first and second layers is a non-cellular polyurethane composition, and the other of said first and second layer is a cellular polyurethane composition, wherein said non-cellular polyurethane composition contains about 0.03 to about 2.0 weight percent of a polysiloxane-polyether block copolymer, said block copolymer containing about 10 to about 30 weight percent dialkylsiloxane units, about 30 to about 70 weight percent oxyethylene units and about 0 to about 55 weight percent other oxyalkylene units.

In another aspect, this invention is a substrate having attached thereto successive polyurethane layers, wherein one of such layers is a cellular polyurethane which is attached directly to a non-cellular polyurethane layer containing about 0.03 to about 2.0 weight percent of a polysiloxane-polyether block copolymer, said block copolymer containing about 10 to about 30 weight percent dialkylsiloxane units, about 30 to about 70 weight percent oxyethylene units and about 0 to about 55 weight percent other oxyalkylene units.

The incorporation of a block copolymer of the type described into the non-cellular polyurethane-forming composition results in a very substantial reduction, and often an elimination, of the bubble line between the polyurethane layers. This results in a stronger, more permanent bond between the layers.

DETAILED DESCRIPTION OF THE INVENTION

In this invention, a substrate is attached directly or indirectly to two adjacent polyurethane layers. One of the polyurethane layers is non-cellular, which for the purposes of this invention means that the layer has a bulk density of at least about 0.8 g/cc. The other polyurethane layer is cellular, which for the purposes of this invention means that the layer has a bulk density of less than 0.8 g/cc, preferably less than 0.6 g/cc, more preferably about 0.05 to about 0.6 g/cc, most preferably about 0.2 to about 0.6 g/cc. The two layers are advantageously formed by applying a polyurethane-forming composition to a previously formed first polyethane layer, and then curing said composition.

The non-cellular polyurethane layer is prepared from a polyurethane-forming composition containing a certain polysiloxane polyether block copolymer. Certain of these materials are known as surfactants useful in preparing polyurethane foam. The polyisiloxane portion is a dialkyl siloxane, preferably dimethyl siloxane, and constitutes about 10 to about 30, preferably about 15 to about 25 weight percent of the block copolymer. The poly(alkylene oxide) portion comprises oxyethylene units in an amount from about 30 to 70, preferably about 30 to about 50, more preferably about 30 to about 45, weight percent of the block copolymer. In addition, the poly(alkylene oxide) portion may contain other alkylene oxide units, particularly oxypropylene units, in an amount from about 0 to about 55, preferably about 30 to about 55, more preferably about 40 to about 55, weight percent of the block copolymer.

These block copolymers often have terminal hydroxyl groups. The terminal hydroxyl groups from the poly(alkylene oxide) portion(s) of the block copolymer may, if desired, be capped with non-isocyanate reactive end groups so the block copolymer does not react with polyisocyanate groups in preparing the polyurethane layer. Generally, this is accomplished by reacting the terminal hydroxyl groups with a compound which will react with the hydroxyl group to form a non-isocyanate reactive end-group. Trialkyl silane, particularly trimethyl silane, and ester, especially acetate, groups, are readily introduced and are preferred for that reason.

In addition, the block copolymer may contain the residues from polyhydric initiators.

The molecular weight of the block copolymer is not especially critical as long as it can be throughly blended with the other components of the polyurethane-forming composition, although those having a molecular weight from about 1000 to about 100,000, preferably about 3000 to about 50,000, more preferably about 10,000 to about 50,000 are especially suitable.

The block copolymer may be of the hydrolyzable (containing Si-O-C bonds) or nonhydrolyzable (containing Si-C bonds) type.

Particularly suitable block copolymers are those having a dimethylsiloxane content of about 15 to about 25 weight percent, about 30 to about 45 weight percent oxyethylene units, about 40 to about 55 weight percent oxypropylene units, and a molecular weight from about 10,000 to about 50,000.

The block copolymer is used in an amount sufficient to reduce the formation of bubbles at the interface of the non-cellular and cellular polyurethane layers. This is achieved when about 0.03 to about 2, preferably about 0.1 to about 0.5 weight percent of block copolymer are used, based on the weight of the polyurethane-forming composition.

In addition the block copolymer, the non-cellular polyurethane composition advantageously contains at least one isocyanate-reactive material and at least one polyisocyanate. Suitable materials and compositions for preparing substantially non-cellular polyurethanes useful for backing a substrate are described, for example, in U.S. Pat. Nos. 4,296,159 and 4,696,849, both incorporated herein by reference.

The isocyanate-reactive material advantageously comprises a relatively high equivalent weight active hydrogen-containing material having an average functionality from about 1.7 to about 3 and an average equivalent weight from about 1000 to about 5000. As used herein, the term "functionality" refers to the number of active hydrogen-containing groups (or in the case of polyisocyanate, the number of isocyanate groups) per molecule. The active hydrogen-containing groups are preferably hydroxyl groups, although carboxylic acid, thiol and primary or secondary amine groups may be present as well. As described in U.S. Pat. No. 4,696,849, it is preferred to use materials having an average functionality of close to about 2.0. Accordingly, it is preferred that the relatively high equivalent weight material have an average functionality from about 1.7 to about 2.2 more preferably about 1.8 to about 2.1. Although a variety of materials such as polyester polyols, polyether polyol, polyacetals and the like are useful, polyether polyols are be far the most preferred, due to low cost and particularly suitable properties. Most preferred are polymers of propylene oxide, especially those having terminal ethylene oxide capping, having an equivalent weight from about 1000 to about 2500 and a functionality from about 1.8 to about 2.1.

The non-cellular polyurethane composition also advantageously contains a polyisocyanates, such as described in U.S. Pat. Nos. 4,296,159 and 4,696,849. Aromatic and aliphatic polyisocyanates are useful herein, with the aromatic polyisocyanates being preferred and toluene diisocyanate (TDI), diphenylmethane diisocyanate (MDI), polymeric MDI and their respective derivatives and prepolymers being most preferred. Sufficient polyisocyanate is advantageously used to provide a ratio of isocyanate groups to active hydrogen containing groups of about 0.85 to about 1.3, preferably about 0.95 to about 1.2. As discussed in U.S. Pat. No. 4,696,849, the polyisocyanate preferably is substantially difunctional, preferably having a functionality from about 1.95 to about 2.2.

In addition, it is often desirable to include in the polyurethane-forming composition a relatively low equivalent weight chain extender or crosslinker. Chain extendes are compounds having two active hydrogen-containing groups per molecule and an equivalent weight from about 31 to about 1000, preferably about 53 to about 200. Crosslinkers are of similar equivalent weight but have in excess of two active hydrogen-containing groups per molecule. Of these, the chain extenders are preferred, as their use permits the overall composition to have a functionality of approximately 2.0. These materials are advantageously used in relatively small amounts compared to the amount of relatively high equivalent weight active hydrogen-containing material. Preferably, about 3 to about 50, preferably about 3 to about 30, more preferably about 5 to about 20 parts of the chain extender and/or crosslinker are used per 100 parts by weight relatively high equivalent weight active hydrogen-containing material.

In addition to the foregoing, various ancillary components may be used in the substantially non-cellular polyurethane-forming composition. Included among these are catalysts, blowing agents, fillers, antioxidants, colorants, antistatic agents, flame retardants, preservatives, and the like. Among these, catalysts and fillers are of particular interest.

Suitable catalysts include tertiary amine compounds and organometallic catalysts. Of the organometallic catalysts, organotin, organoiron and organobismuth catalysts are of particular interest. The use of organoiron and organobismuth catalysts is described, for example, in U.S. Pat. No. 4,611,044, incorporated herein by reference. Suitable organotin catalysts include dibutyltindilaurate, dimethyltindilaurate, stannous octoate, and the like. These catalysts are advantageously used in an amount from about 0.001, preferably from about 0.1 part by weight, up to 5 parts by weight for tertiary amine catalysts and up to about 0.5 parts by weight for organometallic catalysts.

It is usually desirable to employ an inorganic filler in order to reduce costs and to provide certain physical property enhancements. Suitable fillers include aluminum trihydrate, calcium carbonate, carbon black, titanium dioxide, kaolin, wollastonite and the like. Certain of these fillers provide flame retardancy (aluminum trihydrate) or coloration (carbon black and titanium dioxide), as well as function as fillers. Fillers, when used, are advantageously used in amounts from about 30, preferably from about 100, up to about 300, preferably up to about 225, more preferably up to about 205 parts by weight per 100 parts relatively high active hydrogen-containing material.

Although blowing agents such as water, air, nitrogen, halogenated halocarbons and the like may be used to produce the substantially non-cellular layer, their use is advantageously in an amount such that the density of the layer is at least about 0.8 g/cc. Most preferably, no blowing agent is used other than trace quantities of water which may be present as impurities.

The substantially non-cellular polyurethane layer is advantageously formed by forming a layer of the corresponding polyurethane forming composition onto the substrate or the cellular polyurethane layer and curing same. Methods for forming polyurethane layers on substrates are well known and described, for example, in U.S. Pat. Nos. 4,512,831, 4,595,436, 4,657,790 and 4,696,849, all incorporated herein by reference. When the non-cellular polyurethane composition is applied to the substrate, it may or may not be cured before subsequent application of the cellular polyurethane forming composition. However, it is preferred to at least partially cure the non-cellular layer before applying the cellular layer, and most preferred to cure it at least to a tack-free state. Curing is readily effected by heating, such as in an oven or using infrared lamps.

The cellular polyurethane layer is in direct contact with the non-cellular layer. The cellular layer is advantageously formed by applying a layer of a cellular polyurethane composition to the substrate or the non-cellular polyurethane layer and curing same. As stated before, in applying the two polyurethane layers, it is not necessary to cure the first-applied layer before applying the second layer, but such is preferred.

The cellular polyurethane forming composition advantageously comprises a relatively high equivalent weight active hydrogen-containing material, a polyisocyanate and a blowing agent. The high equivalent weight active hydrogen-containing materials and polyisocyanate are as described before with respect to the non-cellular polyurethane composition. The preferred polyisocyanates are TDI, MDI and polymeric MDI as well as prepolymers and derivatives thereof. The most preferred relatively high equivalent weight active hydrogen-containing materials are polymers of propylene oxide, especially those end-capped with oxyethylene units, having an equivalent weight of about 1000 to about 2500. The preferred functionality is from about 2 to about 3 when TDI or prepolymers or derivatives thereof are used as the polyisocyanate, and about 1.7 to about 2.2 when MDI or prepolymers or derivatives thereof are used. The amount of polyisocyanate used is as described before.

The blowing agent is advantageously water, a halogenated hydrocarbon, air, nitrogen, or other material which generates a gas under the conditions of the reaction of the cellular polyurethane composition. It is preferred to froth the composition using suitable equipment, in order to whip air or other inert gas into the composition. Such processes are described in U.S. Pat. Nos. 3,821,130 and 3,862,879. In such processes, some water may be included for additional density reduction. Sufficient blowing agent is used to obtain the densities described before.

In addition to the foregoing components, auxiliary components such as fillers, catalysts, crosslinkers, and the like as described before with respect to the non-cellular polyurethane-forming composition, may be used. It is particularly preferred to employ an organometallic catalyst and from about 50 to about 150 parts of an inorganic filler per 100 parts of relatively high eqivalent weight active hydrogen-containing material. In addition, addition of a small amount of silicone block copolymer is preferred to stabilize the cells of the reaction mixture until it has cured sufficiently to maintain its cellular configuration.

The choice of substrate is not especially critical, and metals, leathers, plastic films, wood surfaces, papers, cardboards and a wide variety of other materials are suitable as the substrate. Of particular interest, however, are woven and non-woven textiles. Among these, of particular interest are textiles suitable for preparing floor coverings, including jute or other webbings, scrims, woven carpets and especially non-woven carpets. The weight of the substantially noncellular polyurethane layer is advantageously about 8 to about 40, preferably about 12 to about 35, ounces/square yard.

The weight of the cellular polyurethane layer is advantageously about 10 to about 40, preferably about 15 to about 35, ounces/square yard.

Formation of the polyurethane-forming compositions into layers and applying same to a substrate is well known. For example, the processes described in U.S. Pat. Nos. 4,512,831, 4,515,646, and 4,657,790 are suitable for this purpose. In general, these processes involve forming a mixture of all components except the polyisocyanate and sometimes the catalyst, then blending in the polyisocyanate (and catalyst if needed) and immediately applying same to the substrate. A doctor bar or rollers are suitable for marrying the polyurethane compositions to the substrate. Curing is advantageously effected by heating, such as in an oven, by infrared heating lamps, or other suitable means.

In preparing floor covering according to this invention, it is most preferred to apply the non-cellular polyurethane layer to the back of the textile, and then to overcoat this layer with a layer of a cellular polyurethane. This is particularly true when the textile is a tufted textile, as the first non-celluar layer serves to glue the tufted fibers to the primary backing material.

The following examples are given to illustrate the invention and are not intended to limit the scope thereof. Unless stated otherwise, all parts and percentages are given by weight.

EXAMPLE 1

A non-cellular polyurethane composition is prepared from the materials listed in Table 1.

TABLE 1

| Component | Parts by Weight |
|---|---|
| Polyol A [1] | 85 |
| Dipropylene glycol | 15 |
| Calcium carbonate | 105 |
| Aluminum trihydrate | 100 |
| Organotin catalyst | 0.1 |
| Silicone surfactant [2] | variable |
| TDI prepolymer [3] | 110 index |

[1] A 1000 equivalent weight poly(propylene oxide) having a nominal functionality of 2.0.
[2] Type and amount indicated in TABLE 3.
[3] Soft segment prepolymer having an equivalent weight of about 156.7 and an average functionality of 2.06.

Carpet Sample Nos. 1–7 and Comparative Samples A, B and C are prepared in the following general procedure. All the materials except the prepolymer and catalysts are thoroughly mixed at room temperature. The prepolymer is then mixed in with the other components, followed by the catalyst. The resulting mixture is then poured onto a tufted Camalon yarn level loop carpet and scraped down to form a layer having a coating weight of about 32 ounces/square yard. In preparing Sample Nos. 1–4 and Comparative Samples A and B, this coated sample is then placed on top of a 140° F. aluminum plate, and a ⅛" layer of a cellular polyurethane composition is applied. The cellular polyurethane composition is as described in Table 2. The resulting composite and underlying aluminum plate are transferred to a 250° F. oven and cured. In preparing Sample Nos. 5–7 and Comparative Sample C, the noncellular polyurethane is cured before applying the foam forming composition.

TABLE 2

| Component | Parts By Weight |
| --- | --- |
| Polyol B [1] | 90 |
| Diethylene glycol | 10 |
| Aluminum trihydrate | 50 |
| Calcium carbonate | 60 |
| Block copolymer [2] | variable |
| Organotin catalyst | 0.08 |
| TDI prepolymer [3] | 110 index |

[1] A 1666 equivalent weight poly(propylene oxide) having a nominal functionality of 3.0 and 15 wt. % ethylene oxide capping.
[2] Type and amount indicated in TABLE 3.
[3] See note [3] of TABLE 1.

The type and amount of block copolymer in the respective polyurethane layers, and the results of these evaluations are reported in Table 3.

TABLE 3

| Sample No. | Cellular Polyurethane [1] | Non-cellular Block Copolymer [2] | | Cellular Block Copolymer [2] | | |
| --- | --- | --- | --- | --- | --- | --- |
| | | Type | Amount | Type | Amount | |
| A* | Uncured | NA | 0 | A | 0.125 | Large bubble line |
| B* | Uncured | NA | 0 | B | 0.125 | Large bubble line |
| 1 | Uncured | B | 0.125 | NA | 0 | Small bubble line |
| 2 | Uncured | A | 0.125 | NA | 0 | Small bubble line |
| 3 | Uncured | B | 0.5 | A | 0.125 | Very small bubbles |
| 4 | Uncured | B | 0.125 | A | 0.125 | Very small bubbles |
| C* | Cured | NA | 0 | A | 0.125 | Small bubble line |
| 5 | Cured | B | 0.125 | NA | 0 | Almost eliminated |
| 6 | Cured | B | 0.5 | B | 0.125 | Very small bubbles |
| 7 | Cured | B | 0.5 | A | 0.125 | Almost eliminated |

*Not an example of this invention.
[1] State of cure when the cellular polyurethane composition is applied.
[2] Surfactant A is a non-hydrolyzable, 12,000 MW copolymer containing about 30 wt % dimethylsiloxane units and 50 wt % ethylene oxide units. Surfactant B is a copolymer containing about 14 weight percent dimethylsiloxane units, 40 weight percent oxyethylene units and 46 weight percent oxypropylene units. Amounts are in parts by weight.

As can be seen from the data in Table 3, addition of a block copolymer to the non-cellular layer causes a substantial decrease in the amount and size of the bubbles at the interface of the two polyurethane layers. The inclusion of a block copolymer in the cellular layer has little effect on the bubble line. The effect of the bubble line on the physical integrity of the carpet is determined subjectively by attempting to pull the cellular polyurethane layer from the composite. In those samples with a large bubble line, the cellular layer delaminates easily at the interface with the noncellular layer. As the size and number of the bubbles decreases, delamination is more difficult. In Sample Nos. 3-7 delamination is quite difficult, with the mode of failure often being tearing of the cellular polyurethane layer itself.

Comparative Sample C is repeated, substituting a Wellco Columbia tufted carpet for that used in Comparative Sample C. A bubble line containing many large bubbles is present. When this sample is again repeated with the Wellco Columbia carpet and 0.125 parts Block copolymer B in the non-cellular composition, the bubble line is essentially eliminated.

When this experiment is repeated using no block copolymer in the cellular polyurethane composition and 0.5 parts of a 6700 molecular weight block copolymer containing about 21% dimethylsiloxane units, 32% oxyethylene units and 47% oxypropylene units in the noncellular polyurethane composition, the bubble line is eliminated.

What is claimed is:

1. A process for preparing a polyurethane backed substrate, comprising applying to a substrate a first layer of a polyurethane-forming composition and applying to said first layer a second layer of a polyurethane forming composition and curing said layers,
    wherein one of said first and second layers is a non-cellular polyurethane composition, and the other of said first and second layers is a cellular polyurethane composition, and
    wherein said non-cellular polyurethane composition contains about 0.03 to about 2.0 weight percent of a polysiloxane-polyether block copolymer, said block copolymer containing about 10 to about 30 weight percent dialkylsiloxane units, about 30 to about 70 weight percent oxyethylene units and about 0 to about 55 weight percent other oxyalkylene units.

2. The process of claim 1 wherein said polysiloxane-polyether block copolymer contains dimethylsiloxane and oxypropylene groups and has a dimethylsiloxane content of about 15 to about 25 percent, an oxyethylene content from about 30 to about 50 percent, and an oxypropylene content from about 30 to about 55 percent.

3. The process of claim 2 wherein said noncellular polyurethane composition comprises a polyether polyol having an equivalent weight from about 1000 to about 5000 and an aromatic polyisocyanate.

4. The process of claim 3 wherein said noncellular polyurethane composition comprises (a) a polymer or copolymer of propylene oxide having an equivalent weight from about 1000 to about 2500, an average functionality for about 1.8 to about 2.2, (b) TDI, MDI or a prepolymer or derivative thereof and (c) about 30 to about 225 parts by weight of an inorganic filler, per 100 parts by weight polyether polyol.

5. The process of claim 3 wherein said cellular polyurethane composition comprises a polyether polyol having an equivalent weight from about 1000 to about 5000, and an aromatic polyisocyanate.

6. The process of claim 5 wherein said cellular polyurethane composition comprises (a) polymer or copolymer of propylene oxide having an average functionality from about 1.8 to about 2.1 and an average equivalent weight from about 1000 to about 2500, (b) TDI, MDI or a prepolymer or derivative thereof and a sufficient quantity of a blowing agent to provide the cellular polyurethane with a density from about 0.2 to about 0.6 pounds/cubic foot.

7. The process of claim 2 wherein said noncellular polyurethane composition contains a relatively high equivalent weight active hydrogen-containing material and about 0.1 to about 0.5 parts of said block copolymer per 100 parts by weight relatively high equivalent weight active hydrogen-containing material.

8. The process of claim 6 wherein non-cellular polyurethane composition contains about 0.1 to about 0.5 part of said block copolymer per 100 parts by weight of said polyether polyol.

9. The process of claim 7 wherein said substrate is a textile.

10. The process of claim 8 wherein said substrate is a textile.

11. A substrate having attached thereto successive polyurethane layers, wherein one of such layers is a cellular polyurethane which is attached directly to a non-cellular polyurethane layer containing about 0.03 to about 2.0 weight percent of a polysiloxane-polyether block copolymer, said block copolymer containing about 10 to about 30 weight percent dialkylsiloxane units, about 30 to about 70 weight percent oxyethylene units and about 0 to about 55 weight percent other oxyalkylene units.

12. The substrate of claim 11 wherein said dialkylsiloxane units are dimethylsiloxane units, said other oxyalkylene units are oxypropylene units, said block copolymer contains about 15 to about 25 weight percent dimethylsiloxane units, about 30 to about 45 weight percent oxyethylene units and about 40 to about 55 weight percent oxypropylene units, and said block copolymer has a molecular weight from about 10,000 to about 50,000.

* * * * *